(12) United States Patent
Szczypinski

(10) Patent No.: US 8,427,825 B2
(45) Date of Patent: Apr. 23, 2013

(54) EXTERNAL ELECTRICAL CONNECTION FOR A PORTABLE ELECTRONIC DEVICE

(75) Inventor: David Kazmierz Szczypinski, Chicago, IL (US)

(73) Assignee: Research In Motion Limited, Waterloo (CA)

( * ) Notice: Subject to any disclaimer, the term of this patent is extended or adjusted under 35 U.S.C. 154(b) by 279 days.

(21) Appl. No.: 12/907,877

(22) Filed: Oct. 19, 2010

(65) Prior Publication Data

US 2012/0092819 A1  Apr. 19, 2012

(51) Int. Cl.
| | |
|---|---|
| *H05K 7/00* | (2006.01) |
| *H05K 3/00* | (2006.01) |
| *H01S 4/00* | (2006.01) |
| *H01K 3/10* | (2006.01) |
| *H01R 43/20* | (2006.01) |

(52) U.S. Cl.
USPC ............ 361/679.41; 361/679.01; 361/679.02; 29/592.1; 29/837; 29/845; 29/852; 29/876

(58) Field of Classification Search ............ 361/679.01, 361/679.02, 679.41; 29/592.1, 623.2, 837, 29/845, 852, 876
See application file for complete search history.

(56) References Cited

U.S. PATENT DOCUMENTS

| | | | |
|---|---|---|---|
| 5,816,847 A | 10/1998 | Snyder | |
| 6,356,442 B1 | 3/2002 | Lunsford | |
| 6,667,719 B2 * | 12/2003 | LaKomski | ..................... 343/702 |
| 6,717,801 B1 * | 4/2004 | Castell et al. | ............ 361/679.41 |
| 6,870,733 B2 | 3/2005 | Castell | |
| 7,265,517 B2 * | 9/2007 | Bumiller | ....................... 320/114 |
| 7,312,984 B2 | 12/2007 | Richardson | |
| 2004/0053533 A1 | 3/2004 | Huang | |
| 2005/0270244 A1 * | 12/2005 | Lam et al. | ..................... 343/702 |
| 2008/0096398 A1 | 4/2008 | Rohrbach | |

OTHER PUBLICATIONS

MagSafe; http://en.wikipedia.org/wiki/MagSafe; retrieved on Jan. 12, 2010.

* cited by examiner

*Primary Examiner* — Timothy Thompson
*Assistant Examiner* — Sherman Ng
(74) *Attorney, Agent, or Firm* — Novak Druce Connolly Bove + Quigg LLP

(57) ABSTRACT

A portable electronic device includes: a housing, a processor provided in the housing, a rechargeable power pack provided in the housing in communication with the processor, apertures extending through the housing, insulating portions of the housing being provided between the apertures, a location of the apertures being selected to map out a graphical element, electrical contacts in communication with the battery for charging the battery, the electrical contacts being sized to be received in the apertures and wherein the insulating portions are provided for insulating the electrical contacts from one another.

11 Claims, 11 Drawing Sheets

EXTERNAL ELECTRICAL CONNECTION FOR A PORTABLE ELECTRONIC DEVICE

TECHNICAL FIELD

The present embodiments relate to portable electronic devices having external electrical connections for power and/or data transfer.

BACKGROUND

The rapid advancement of portable electronic device technology has seen devices become smaller while device functionality has increased. The speed at which new models are released is driven by the highly competitive portable electronic device market. In addition to including the latest features, portable electronic devices must be visually appealing in order to be successful products in the marketplace.

Most portable electronic devices include external connections for plugging in a recharger for a rechargeable power pack (such as a battery charger), a USB cable or other auxiliary device. These external connections tend to detract from the sleek, streamlined look that is desirable in most devices. Often, portable device manufacturers attempt to reduce the visual impact of the external connections by locating the connections along device edges so that they are less noticeable. Further, some external connections may be vulnerable to the ingress of fluid and solid particles, which can damage the portable electronic device or impair its functionality.

DRAWINGS

The following figures set forth embodiments in which like reference numerals denote like parts. Embodiments are illustrated by way of example and not by way of limitation in the accompanying figures.

DETAILED DESCRIPTION

In an aspect there is provided a portable electronic device including: a housing; a processor provided in said housing; a rechargeable power pack provided in said housing in communication with said processor; apertures extending through said housing, insulating portions of said housing being provided between said apertures, a location of said apertures being selected to map out a graphical element; electrical contacts in communication with said battery for charging said battery, said electrical contacts being sized to be received in said apertures; wherein said insulating portions are provided for insulating said electrical contacts from one another.

In another aspect there is provided a method of manufacturing a portable electronic device including: forming apertures in a housing of the portable electronic device, the apertures being sized to receive electrical contacts that communicate with a power pack of the portable electronic device, a location of the apertures being selected to map out a graphical element; wherein the apertures are spaced from one another so that the electrical contacts are insulated from each another.

Figure 1:
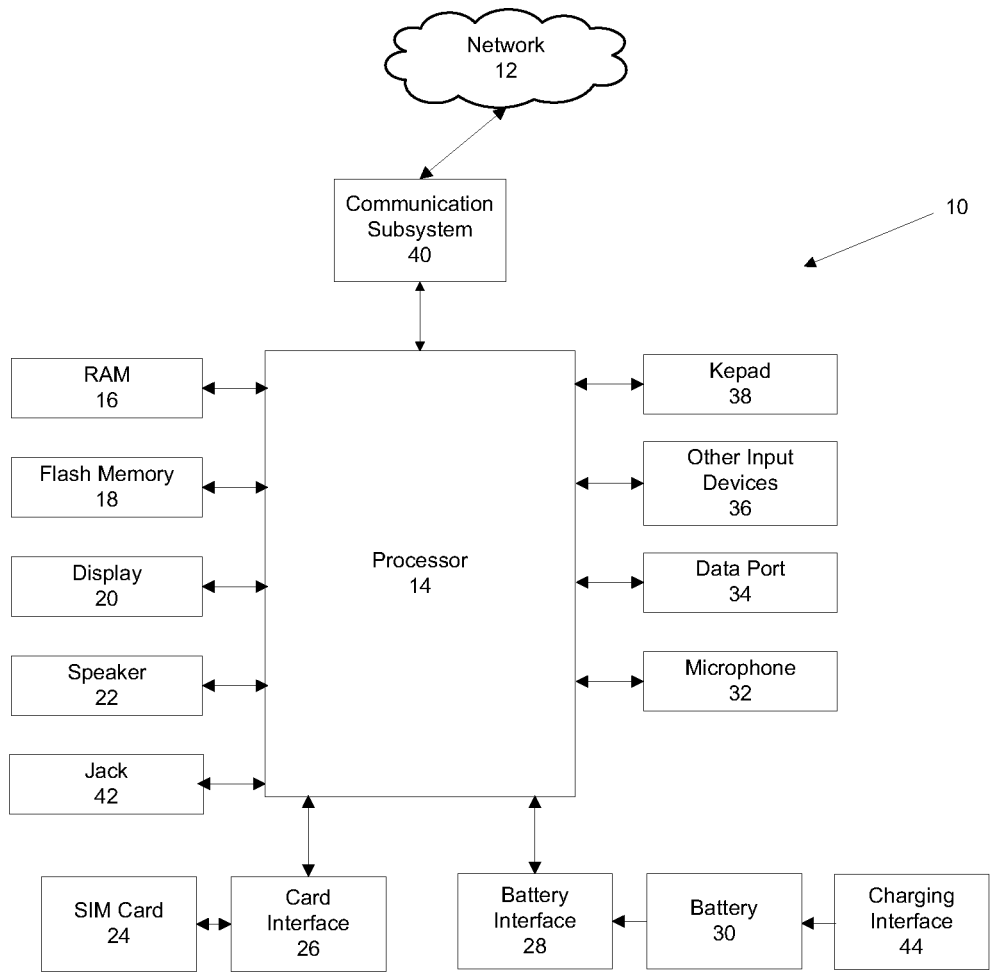
FIG. 1 is a block diagram of a portable electronic device according to an embodiment.

Referring now to FIG. 1, components of a typical portable electronic device 10 according to an embodiment are generally shown. The portable electronic device 10 includes data communication capabilities and may communicate with other electronic devices directly or through a wireless network. The portable electronic device 10 is based on the computing environment and functionality of a handheld computer, such as a wireless personal digital assistant (PDA), for example. It will be understood, however, that the portable electronic device 10 is not limited to a wireless personal digital assistant. Other portable electronic devices are possible, such as cellular telephones, smart telephones, electronic messaging devices, media players and laptop computers.

The portable electronic device 10 includes a number of components including processor 14, which controls the overall operation of the device 10. A communication subsystem 40 controls data and voice communication functions, such as email, PIN (Personal Identification Number) message functions, SMS (Short Message Service) message functions and cellular telephone functions, for example. The communication subsystem 40 is in communication with a wireless network 12, which may be a data-centric wireless network, a voice-centric wireless network or a dual-mode wireless network.

In FIG. 1, the communication subsystem 40 is a dual-mode wireless network that supports both voice and data communications. The communication subsystem 40 is configured in accordance with the Global System for Mobile Communication (GSM) and General Packet Radio Services (GPRS) standards. The communication subsystem 40 may alternatively be configured in accordance with Enhanced Data GSM Environment (EDGE) or Universal Mobile Telecommunications Service (UMTS) standards. Other wireless networks may also be associated with the portable electronic device 10, including Code Division Multiple Access (CDMA) or CDMA2000 networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The wireless network 12 includes base stations (not shown) that provide a wireless link to the portable electronic device 10. Each base station defines a coverage area, or cell, within which communications between the base station and the portable electronic device 10 can be effected. It will be appreciated that the portable electronic device 10 is movable within the cell and can be moved to coverage areas defined by other cells. Data is delivered to the portable electronic device 10 via wireless transmission from the base station. Similarly, data is sent from the portable electronic device 10 via wireless transmission to the base station.

The communication subsystem 40 further includes a short range communications function, which enables the device 10 to communicate directly with other devices and computer systems without the use of the wireless network 12 through infrared or Bluetooth™ technology, for example.

Prior to the portable electronic device 10 being able to send and receive communication signals over the wireless network 12, network registration or activation procedures must have been completed. In order to enable network communication, a SIM (Subscriber Identity Module) card 24 is inserted into a card interface 26. The SIM card, or Removable User Identity Module card, is used to identify the user of the mobile device, store personal device settings and enable access to network services, such as email and voice mail, for example, and is not bound to a particular portable electronic device 10.

The processor 14 is also connected to a Random Access Memory (RAM) 16 and a flash memory 18. An operating system and device software are typically stored in flash memory 18 and are executable by the processor 14. Some device software components may alternatively be stored in RAM 16. The portable electronic device 10 includes computer executable programmed instructions for directing the portable electronic device 10 to implement various applications. Some examples of applications that may be stored on and executed by the device 10 include: electronic messaging, games, calendar, address book and music player applications. Software applications that control basic device operation, such as voice and data communication, are typically installed during manufacture of the device 10. For devices that do not include a SIM card 24, user identification information may be programmed into the flash memory 18. The flash memory 18 may alternatively be a persistent storage, a Read-Only Memory (ROM) or other non-volatile storage.

Figure 2:
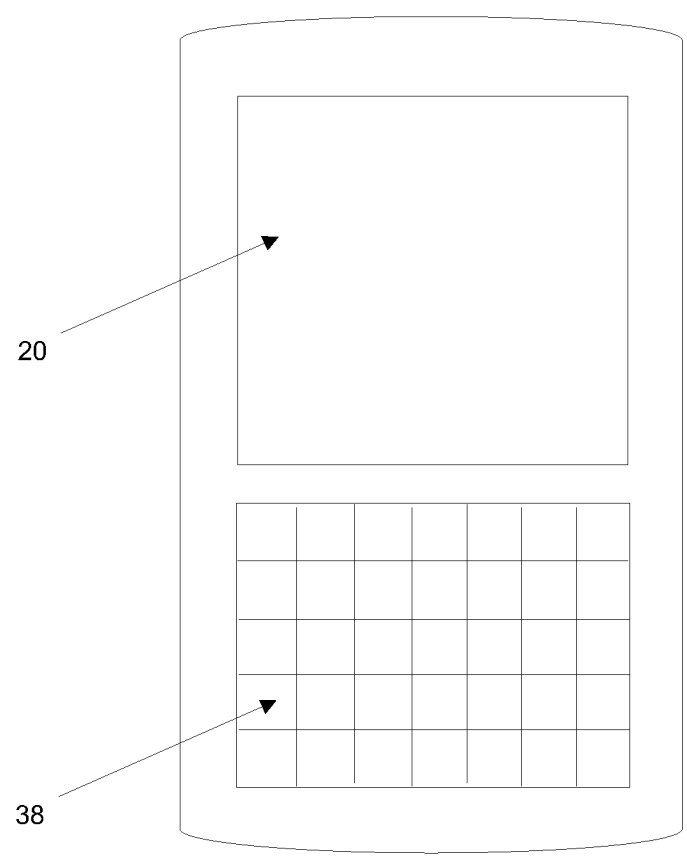
FIG. 2 is a front view of the portable electronic device of FIG. 1.

Referring also to FIG. 2, the processor 14 receives input from various input devices including a keypad 38 and other input devices 36. The keypad 38 may be a complete alphanumeric keypad or telephone-type keypad. The other input devices 36 may replace or complement the keypad 38 to facilitate input and may include devices such as: single or multi-function buttons, a touch screen, a mouse, a trackball, a capacitive touch sensor or a roller wheel with dynamic button pressing capability. The portable electronic device 10 of FIG. 2 is shown by way of example and it will be appreciated by a person skilled in the art that many different device types, shapes and input device configurations are possible.

The processor 14 outputs to various output devices including an LCD display screen 20. A microphone 32 and speaker 22 are connected to the processor 14 for cellular telephone functions. A data port 34 is connected to the processor 14 for enabling data communication between the portable electronic device 10 and another computing device. The data port 34 may include data lines for data transfer and a supply line for charging a rechargeable power pack or an element thereof. In general, the power pack is in communication with power-consuming components of the portable electronic device 10, that is, the power pack is capable of supplying power to power-consuming components. A power pack may include one or more power elements, such as a fuel cell or a supercapacitor or one or more rechargeable batteries (which may or may not be user-replaceable). A typical kind of rechargeable power pack includes a rechargeable battery, so for purposes of simplicity, the power pack will be referred to as a battery 30 of the portable device 10. Battery interface 28 is provided for receiving one or more rechargeable batteries 30. Alternately, as in the embodiment shown in FIG. 1, the data port 34 is usable for data transfer only and a charging interface 44 is provided to allow for charging of battery 30.

The portable electronic device 10 is operable in a data communication mode and a voice communication mode. In the data communication mode, a received data signal representing information such as a text message, an email message, a media file to be transferred, or web page download is processed by the communication subsystem 40 and input to the processor 14. The processor 14 further processes the signal and renders images for display on the display screen 20. Alternatively, the processed signals may be output to another computing device through the data port 34. In order to transmit information in the data communication mode, the user of the portable electronic device 10 composes information for transmission, such as email messages, for example, using the keypad 38 and other input devices 36 in conjunction with the display screen 20. The composed information is transmitted through the communication subsystem 40 over the wireless network 12 or via short range communications. Operation of the portable electronic device 10 in the voice communication mode is similar to the data communication mode, however, the received signals are output to the speaker 22, or an auxiliary device such as a headset or headphones, and signals for transmission are generated by the microphone 32. The portable electronic device 10 may also include other voice sub-systems, such as a voice message recording subsystem, for example.

Only a limited number of device subsystems have been described. It will be appreciated by a person skilled in the art that additional subsystems corresponding to additional device features may also be connected to the processor 14.

Figure 3:
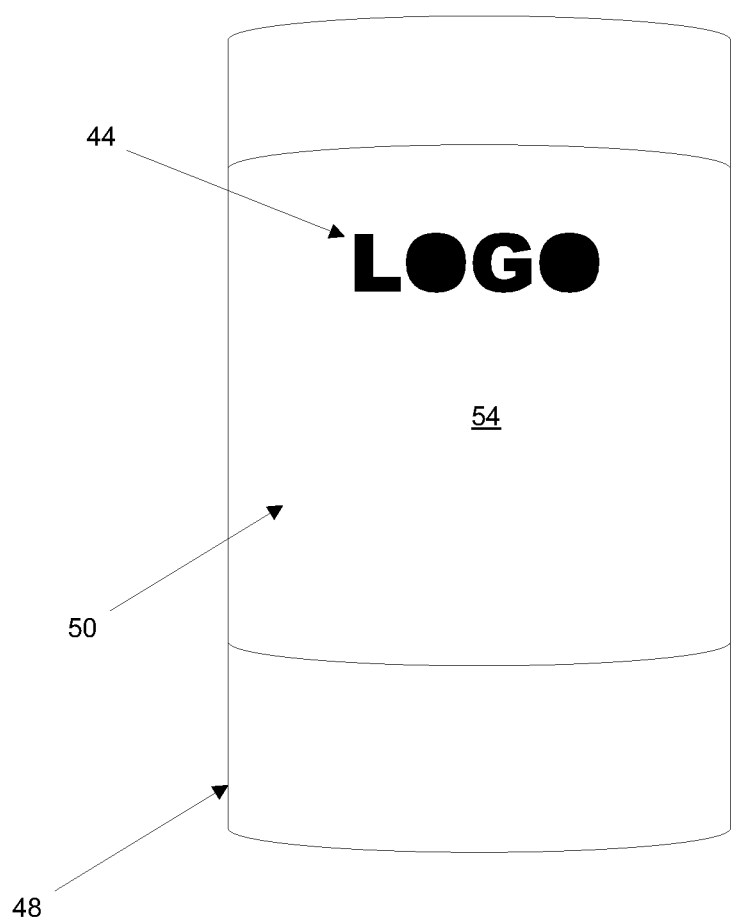
FIG. 3 is a rear view of the portable electronic device of FIG. 1.

Referring to FIG. 3, the battery charging interface 44 of the portable electronic device 10 (which is not necessarily the same as the battery interface 28) is accessible via a battery door 50. That is, power may be delivered to the battery charging interface 44, part of which may be visible or contactable through one or more apertures 64 in the battery door 50, as shown in FIG. 4B, and it is generally not necessary for a user to open or remove the battery door 50 to use the battery charging interface 44. The battery door 50 forms part of a housing 48 of the portable electronic device 10. The battery door 50 includes an outer surface 54 and an inner surface 58. The apertures 64 are formed in the battery door 50 by a suitable manufacturing method, such as molding or hole punching, for example.

Figure 4A:
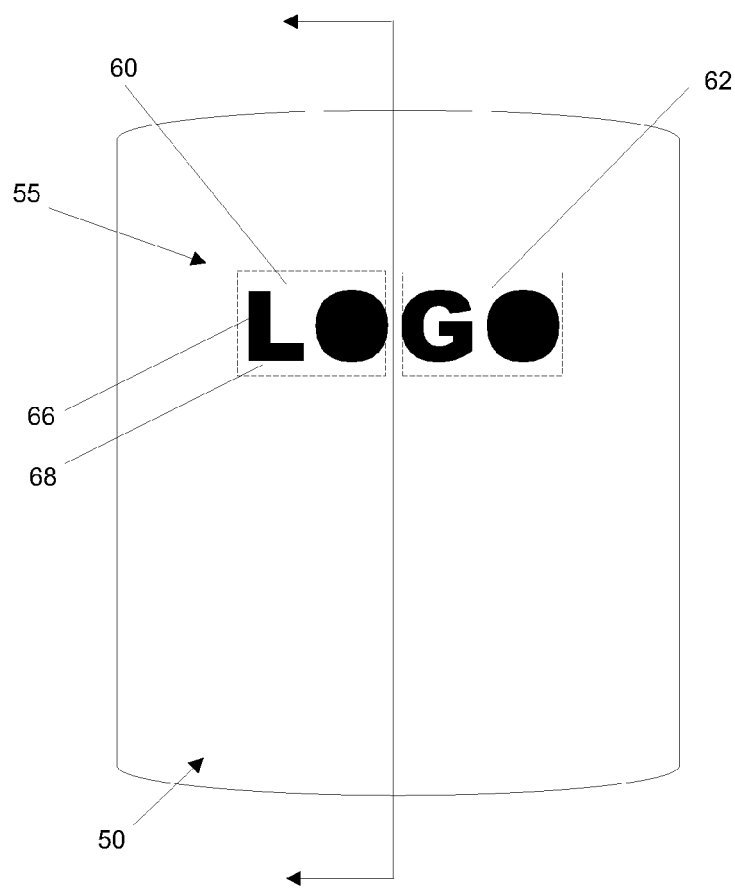
FIG. 4A is a view of an outside surface of a battery door of the portable electronic device of FIG. 1.
Figure 4B:
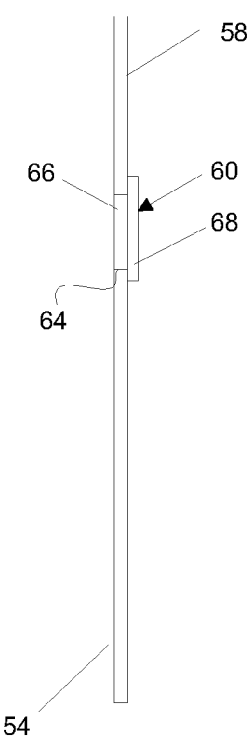
FIG. 4B is a view on 4B-4B of FIG. 4A.
Figure 5:
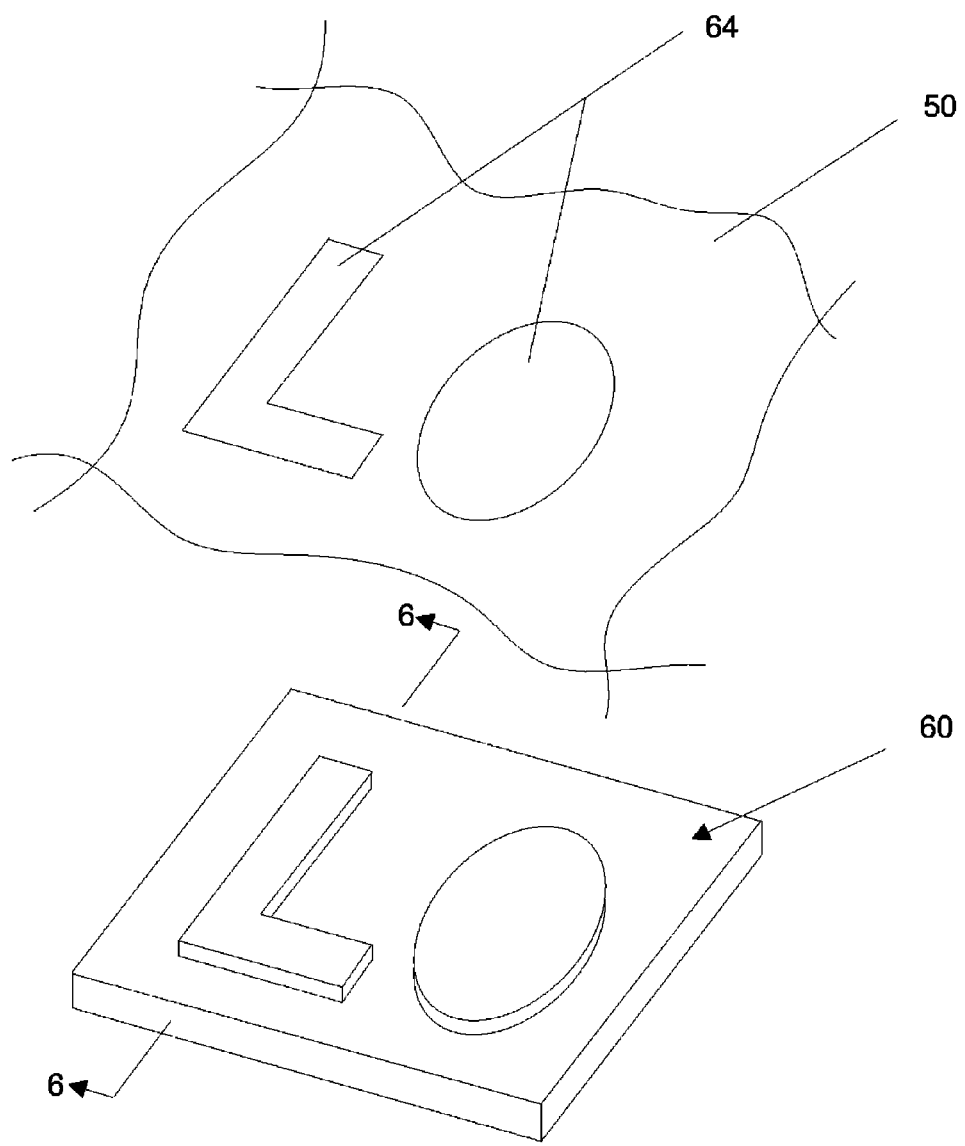
FIG. 5 is an exploded isometric view of a portion of FIG. 4A.

As shown in FIGS. 4A and 4B, the battery charging interface 44 includes first electrical contacts 60, which provide a first current path and second electrical contacts 62, which provide a second current path. The first current path is electrically insulated from the second current path. Each of the first electrical contacts 60 and the second electrical contacts 62 includes an outer portion 66, which is accessible from outside of the housing 48, and an inner portion 68, which communicates with internal components of the portable electronic device 10. The battery door 50 includes apertures 64, which are shown in FIG. 5, that are shaped to receive the outer portions 66 of the first and second electrical contacts 60, 62.

As shown, the apertures 64 map out a graphical element 55, which is visible on the rear side of the device 10. The outer portions 66 of the first and second electrical contacts 60, 62 are shaped to be received in the apertures 64 to define the graphical element 55. The graphical element 55 may be a logo, a registered trademark or any word, symbol or combination thereof that is associated with the device 10. In general, the logo is provided to identify the manufacturer and/or brand of the portable electronic device 10 while adding aesthetically to the appearance thereof. By splitting the metal of a single graphical element 55 into two or more parts, each part is able to act as an independent electrical conductor.

Figure 6:
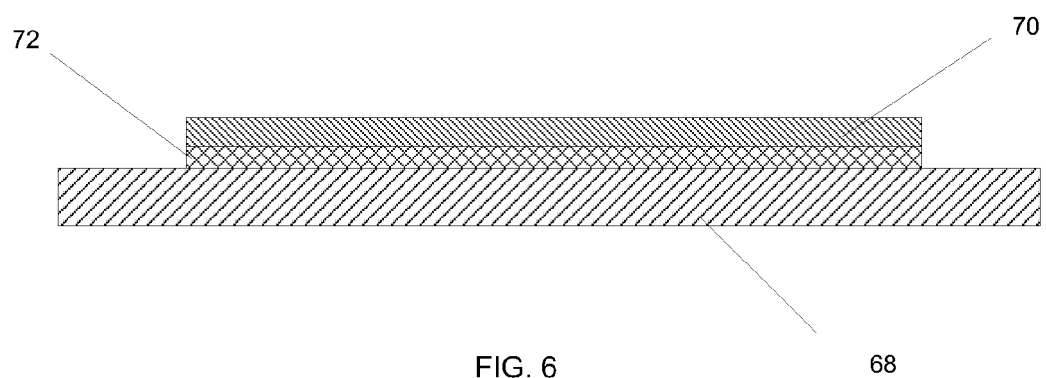
FIG. 6 is a view on 6-6 of FIG. 5.

Referring to FIG. 6, the outer portion 66 of the electrical contacts 60, 62 includes a first layer 70 and a second layer 72. The materials of the first layer 70 and second layer 72 are selected in order to enable a good electrical connection with an auxiliary battery charging device. In one embodiment, the second layer 72 is made of nickel, the first layer 70 is made of gold plating and the inner portion 68 of the electrical contacts 60, 62 is made of a metal substrate. The first electrical contacts 60 are insulated from the second electrical contacts 62 by insulating portions 65 of the housing 48. As shown, insulating portions 65 of the battery door 50, which is made of a non-conductive material, such as plastic, for example, provide insulation between the first and second electrical contacts 60, 62. As will be appreciated by a person skilled in the art, other conductive materials may alternatively be used for the charging interface 44 and other non-conductive materials may be used for the battery door 50. The electrical contacts 60, 62 may be manufactured using any suitable manufacturing method including: metal injection molding, stamping, forging or other custom manufacturing method, for example.

In one embodiment, the gold plating is colored. In this embodiment, the logo of the charging interface 44 is white, yellow, black, green, red or any combination thereof. It will be appreciated by a person skilled in the art that other colors and combinations of colors are also possible.

The apertures 64 of the housing 48 are sized to receive the outer portions 66 of the first and second electrical contacts 60, 62 and provide a seal therebetween. The seal limits ingress of fluid or solid particles into the housing 48 of the portable electronic device 10. In one embodiment, an interference fit is provided between the apertures 64 and the outer portions 66 to provide a seal. In another embodiment, the charging interface 44 is insert molded and includes plastic molded around the first and second electrical contacts 60, 62. In still another embodiment, the charging interface 44 is assembled with an adhesive or silicone potting to provide a seal.

In the embodiment of FIGS. 1 to 8, the inner portions 68 of the first and second electrical contacts 60, 62 communicate with the battery 30. The electrical connection between the first and second electrical contacts 60, 62 and the battery 30 occurs through discrete contacts, selective plating, PCBs (Printed Circuit Board), wires or any other suitable manner that is known in the art.

Figure 7:
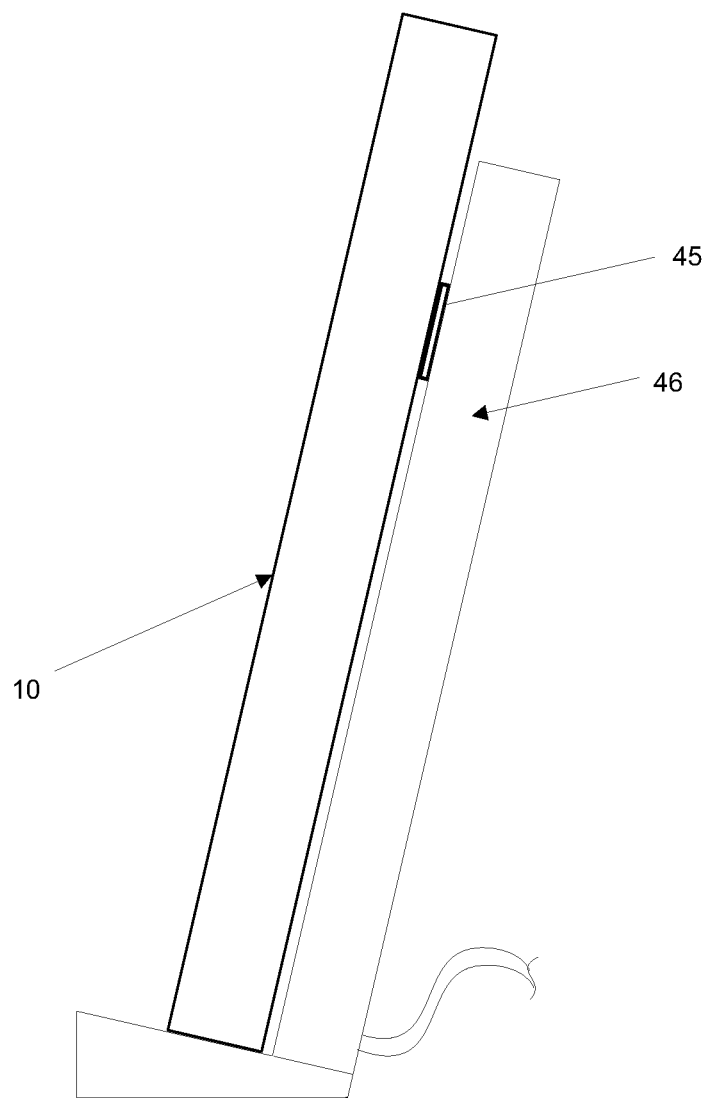
FIG. 7 is a side view of the portable electronic device of FIG. 1 received in an auxiliary cradle device.
Figure 8:
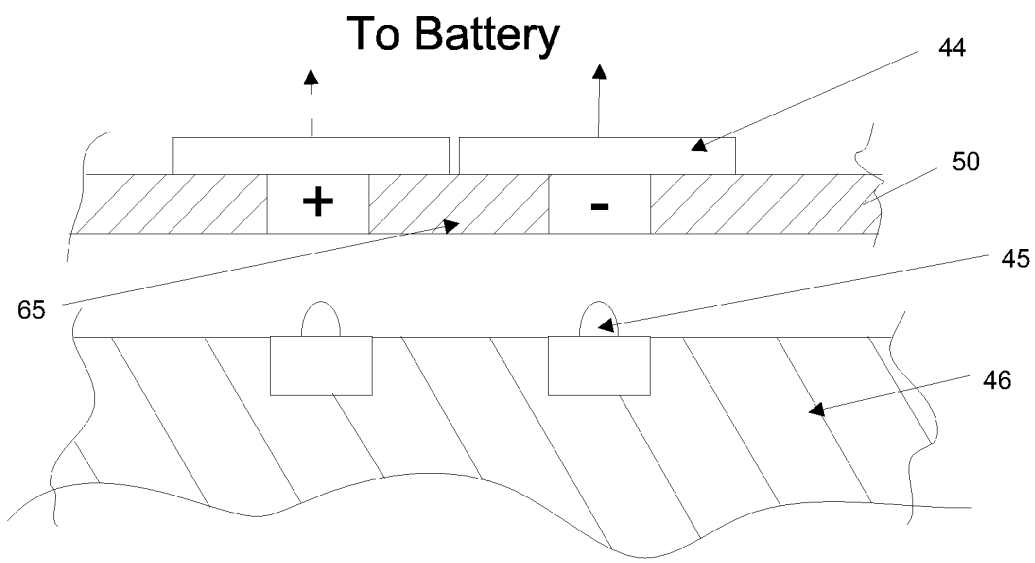
FIG. 8 is a schematic view of the electrical connection of FIG. 7.

In operation, the user places the portable electronic device 10 in a charging dock 46 when charging of the battery 30 is desired, as shown in FIG. 7. When properly positioned in the charging dock 46, the battery charging interface 44 of the portable electronic device 10 communicates with the electrical contacts 45 of the charging dock 46 to allow for charging of the battery 30. As shown in FIG. 8, one of the first and second electrical contacts 60, 62 is coupled to a positive terminal of the battery 30 and the other of the first and second electrical contacts 60, 62 is coupled to a negative terminal of the battery 30 to charge the battery 30.

The charging dock 46 shown in FIG. 7 is a cradle-type charging dock in which the portable electronic device 10 is received in a semi-upright position. It will be appreciated by a person skilled in the art that other types of charging docks are also possible. The electrical contacts 45 of the charging dock 46 may be pogopins, leaf springs, or another suitable type of contact to allow for contact with the charging dock 46. It will further be appreciated by a person skilled in the art that although a charging dock 46 is shown, other types of auxiliary charging devices may alternatively be used to charge the battery.

The electrical contacts 60, 62 are shown as being flush with the outer surface 54 of the housing 48. The electrical contacts 60, 62 may alternatively protrude from said housing 48 or be recessed in said housing 48. The auxiliary charging device would similarly include recessed or protruding electrical contacts for mating with the charging interface 44.

Figure 9:
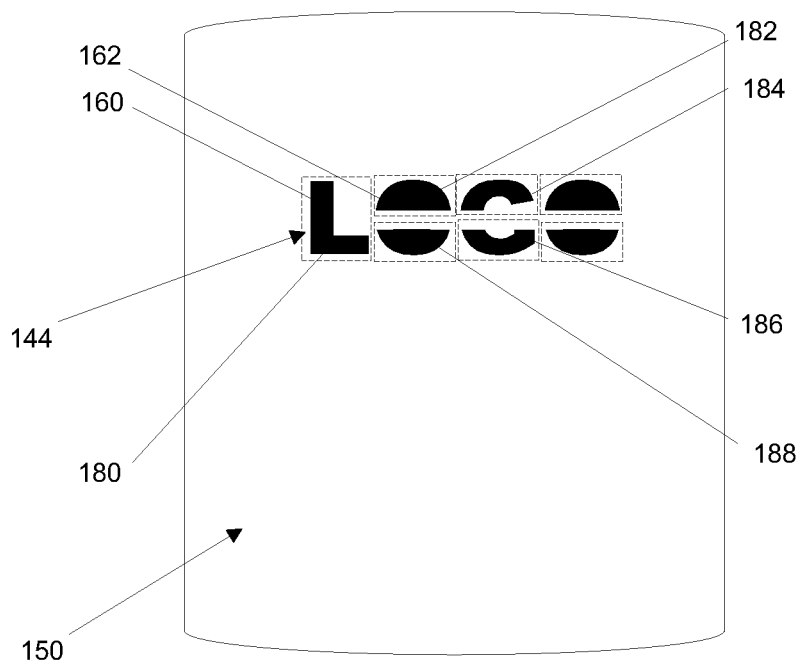
FIG. 9 is a view of an outside surface of a battery door of a portable electronic device according to another embodiment.

Referring to FIG. 9, a battery door 150 according to another embodiment of a portable electronic device is generally shown. As shown, charging interface 144 has a similar appearance to the charging interface 44 of FIG. 2, however, includes seven electrical contacts 160, 162, 180, 182, 184, 186 and 188. Each of the seven electrical contacts 160, 162, 180, 182, 184, 186 and 188 includes a current path that is electrically insulated from the current paths of the other electrical contacts 160, 162, 180, 182, 184, 186 and 188 by the battery door 150. The electrical contacts 160, 162, 180, 182, 184, 186 and 188 include an outer portion, an inner portion and are generally similar in construction to the electrical contacts 60 and 62 of the embodiment of FIG. 3.

Figure 10:
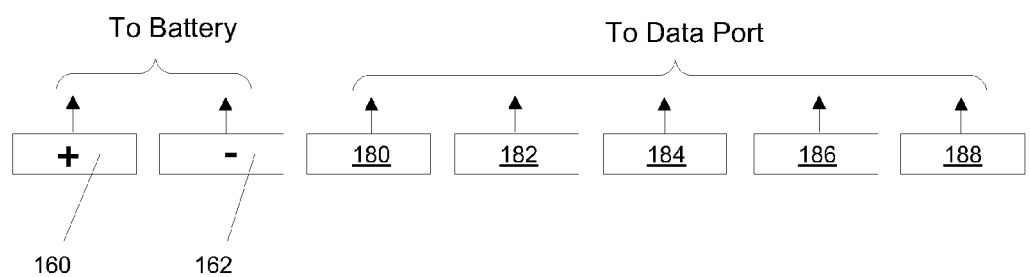
FIG. 10 is a schematic view of electrical contacts of the portable electronic device of FIG. 9.

The charging interface 144 of FIG. 9 is provided in communication with the battery 30 and the data port 34 and is capable of both power and data transfer. As shown in FIG. 10, electrical contacts 160 and 162 are provided in electrical communication with the battery 30 in order to enable charging thereof. Electrical contacts 180, 182, 184, 186 and 188 are provided in communication with the data port 34 in order to enable data transfer to and from the portable electronic device 10. For example, the electrical contacts 180, 182, 184, 186 and 188 may be configured as a 5-pin USB connector. As is know in the art, the 5-pin USB connector may be used to transfer data between the portable electronic device and an auxiliary device, such as a computer, for example. In one embodiment, the data port 34 is eliminated and the electrical contacts that are in direct communication with processor 14.

Figure 11:
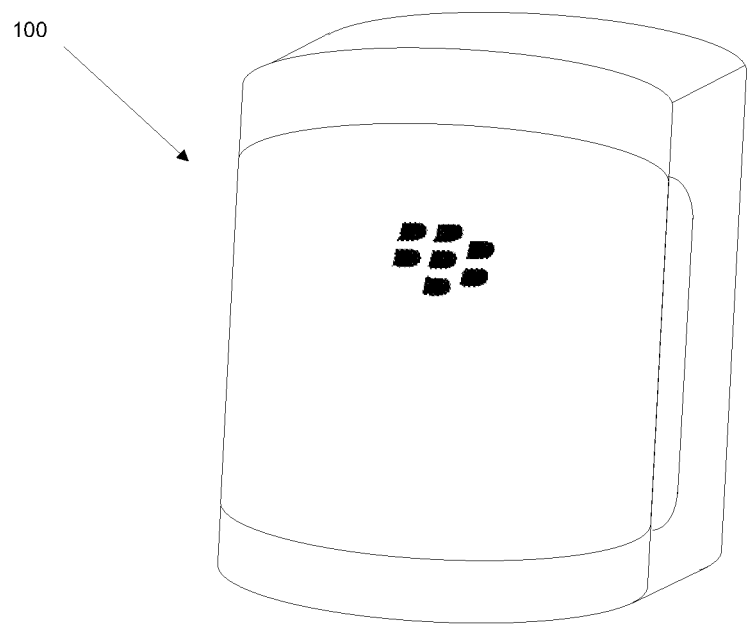
FIG. 11 is an example of a portable electronic device according to the embodiment of FIG. 9.

In one example, the portable electronic device 100 is a flip-type device that is stored in a closed position, which shown in FIG. 11, and operable in an open position (not shown) in which a primary display screen and keyboard are visible. The charging interface 144 includes seven electrical conductors that are arranged in the shape of a Blackberry™ logo. The Blackberry™ logo of FIG. 11 includes seven slanted quadrilaterals having rounded corners on a leading edge thereof.

Figure 12:
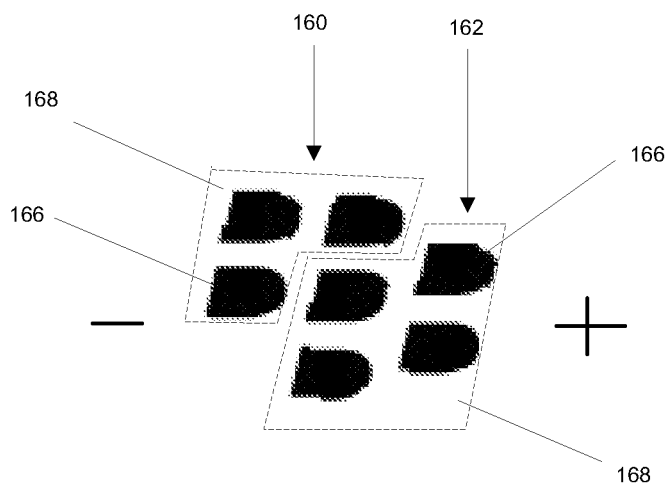
FIG. 12 is a view of a portion of an outside surface of a battery door of the portable electronic device of FIG. 11 according to another embodiment.

In another embodiment, which is shown in FIG. 12, two electrical contacts 160, 162 are provided. Each of the two electrical contacts 160, 162 includes a single inner portion 168 and multiple outer portions 166, which are shaped to be received in apertures of the housing. The apertures map out the Blackberry™ logo of FIG. 11. In this embodiment, the electrical contacts 160, 162 communicate with positive (+) and negative (−) terminals of the battery 30 to allow for charging thereof.

Although embodiments of the portable electronic device including two electrical contacts and seven electrical contacts have been shown, it will be appreciated by a person skilled in the art that portable electronic devices having any number of electrical contacts may be provided. For example, a 4-pin, 10-pin or 16-pin USB connector may be provided. It will further be appreciated that the embodiments described may be applied to any logo that may be divided into two or more parts to provide two or more individual electrical connections to the portable electronic device.

Although the charging interface 44, 144 has been described are being accessible through a battery door 50, 150, it will be appreciated by a person skilled in the art that the charging interface 44, 144 may alternatively be provided on a front surface of said portable electronic device 10 or any other location where a logo may be provided. In addition, the portable electronic device 10 need not include a battery door. In one embodiment, the battery charging interface 44, 144 may be accessible through a rear panel, a front panel or a side panel of the housing. In a further embodiment, there may be no user-operable panel or opening for replacement of the battery, as the battery would be substantially permanently mounted in the portable electronic device 10.

The integration of the electrical contacts of the charging interface 44, 144 into a logo of a portable electronic device 10 allows the portable electronic device 10 to have a sleek, streamlined appearance. In this way, an element that may have cosmetic function may also have convenient utility function as well. In addition, the part count of the portable electronic device 10 may be reduced, which reduces manufacturing cost and production time.

A further possible advantage of the described embodiments is that when power and/or data are transferred via the charging interface 44,144 instead of including open electrical connections, the charging interface 44, 144 of the portable electronic device 10 is environmentally sealed. In general, environmentally sealed means that the internal components of the product are protected from the conditions under which the product is used. Conditions experienced by the portable electronic device 10 may include: rain, submersion in water, humidity, dust and dirt, for example. The charging interface 44, 144 allows the portable electronic device 10 to be rated according to Ingress protection (IP) standards that measure the amount of protection that a product offers from external liquid or solid particles.

Specific embodiments have been shown and described herein. However, modifications and variations may occur to those skilled in the art. All such modifications and variations are believed to be within the scope and sphere of the present embodiments.

The invention claimed is:

1. A portable electronic device comprising:
    a housing;
    a processor provided in the housing;
    a rechargeable power pack provided in the housing in communication with the processor;
    apertures extending through the housing, insulating portions of the housing being provided between the apertures, a location of the apertures being selected to map out a graphical element;
    electrical contacts in communication with the rechargeable power pack for charging the rechargeable power pack, the electrical contacts being sized to be received in the apertures;
    wherein the insulating portions are provided for insulating the electrical contacts from one another.

2. A portable electronic device as claimed in claim 1, wherein the electrical contacts are in communication with the processor for data transfer with an auxiliary device.

3. A portable electronic device as claimed in claim 1, wherein the graphical element is a logo.

4. A portable electronic device as claimed in claim 1, wherein the electrical contacts protrude from the housing.

5. A portable electronic device as claimed in claim 1, wherein the electrical contacts are recessed in the housing.

6. A portable electronic device as claimed in claim 1, wherein a seal is provided between the apertures and the electrical contacts.

7. A portable electronic device as claimed in claim 1, wherein the electrical contacts include a layer of colored gold plating.

8. A portable electronic device as claimed in claim 1, wherein first ones of the electrical contacts provide a first current path and second ones of the electrical contacts provide a second current path, the first current path and the second current path being insulated from one another.

9. A portable electronic device as claimed in claim 1, comprising:
    seven apertures extending through the housing, each of the apertures having a quadrilateral shape with a rounded leading edge and two electrical contacts in communication with the rechargeable power pack for charging the rechargeable power pack, a first one of the two electrical contacts comprising three outer portions sized to be received in three of the seven apertures and a second one of the two electrical contacts comprising four outer portions sized to be received in four of the seven apertures.

10. A portable electronic device as claimed in claim 1, comprising:
    seven apertures extending through the housing, each of the apertures having a quadrilateral shape with a rounded leading edge, the seven apertures for receiving seven electrical contacts, two of the seven electrical contacts being in communication with the rechargeable power pack for charging the rechargeable power pack and five of the seven electrical contacts being in communication with the processor for transferring data to the portable electronic device.

11. A method of manufacturing a portable electronic device comprising:
    forming apertures in a housing of the portable electronic device, the apertures being sized to receive electrical contacts that communicate with a power pack of the portable electronic device, a location of the apertures being selected to map out a graphical element;
    wherein the apertures are spaced from one another so that the electrical contacts are insulated from each another.

* * * * *